United States Patent
Inoue

[19]

[11] Patent Number: 5,965,885
[45] Date of Patent: Oct. 12, 1999

[54] PROBE SCANNING APPARATUS FOR PROBE MICROSCOPE

[75] Inventor: Akira Inoue, Chiba, Japan

[73] Assignee: Seiko Instruments Inc., Japan

[21] Appl. No.: 08/968,193

[22] Filed: Nov. 12, 1997

[51] Int. Cl.$^6$ .................................................. H01J 37/00
[52] U.S. Cl. ...................................... 250/306; 250/423 F
[58] Field of Search ................................... 250/306, 307, 250/423 F

[56] References Cited

U.S. PATENT DOCUMENTS

| | | | |
|---|---|---|---|
| 4,874,980 | 10/1989 | Mine et al. | 310/328 |
| 5,103,174 | 4/1992 | Wandass | 324/244 |
| 5,436,448 | 7/1995 | Hosaka et al. | 250/307 |
| 5,479,013 | 12/1995 | Forster et al. | 250/306 |
| 5,557,452 | 9/1996 | Harris | 250/306 |
| 5,646,339 | 7/1997 | Bayer et al. | 250/306 |
| 5,808,302 | 9/1998 | Binnig et al. | 250/306 |

FOREIGN PATENT DOCUMENTS

807799A1   11/1997   European Pat. Off. .

WO9607074   3/1996   WIPO .

OTHER PUBLICATIONS

Journal of Vacuum Science & Technology: Part B, vol. 12, No. 3, May 1, 1994, pp. 1662–1664, J. Tapson et al., "Improved Scanning Tunneling Microscope Feedback Performance By Means of Separate Actuators".

*Primary Examiner*—Bruce Anderson
*Attorney, Agent, or Firm*—Adams & Wilks

[57] ABSTRACT

A spring is connected to an edge section of a sample side of a spindle receiving a force in the Z-axial direction by a first poise coil motor, and a probe is attached to the tip of the spring. The spindle is supported by an internal tube with a spring. The movement of the spindle is enlarged by the spring to be conveyed to the probe, whereby displacement of the probe is amplified. For this reason, a resonance frequency f0 of a system comprising the movable element of the first poise coil motor, spindle, spring, spring and probe can be increased. If the spring is changed to springs in two stages, a resonance frequency f0 of the system can be increased with comparatively compact configuration.

9 Claims, 5 Drawing Sheets

PROBE SCANNING APPARATUS FOR PROBE MICROSCOPE

BACKGROUND OF THE INVENTION

The present invention relates to a probe scanning apparatus for a probe microscope, and more particularly to a probe scanning apparatus for a probe microscope designed to enable a higher resonance frequency of a probe scanning mechanism.

There is an apparatus using a piezo-scanner as one example of a probe scanning apparatus for a scanning type of probe microscope based on the conventional technology. In this piezo-scanner, the relation (impressed voltage-displacement characteristics) between an impressed voltage to an electrode of a piezo element and a displacement rate thereof is non-lineaty, so that the displacement rate can not be made larger. It is also difficult to handle the piezo-element because it is required to impress a high voltage in a range from around hundreds of volts to a thousand volts to the electrode, which requires shielding of the periphery thereof or a protection circuit that reduces the voltage when a cover of the apparatus is opened.

Therefore, the owner of the present invention developed a sample positioning apparatus in which a pulse motor as a coarse adjustment mechanism in the Z-axial direction and screws or the like were replaced with a housing with a viscous body accommodated therein, a heater mechanism, and a poise coil mechanism, and in which a piezo-element as a fine adjusting element in the z-axial direction was also replaced with a spring element, and a patent application for the developed apparatus was filed in Japan under Japanese Patent Application No. HEI 8-25201 and in the United States under Ser. No. 08/800,074.

With this sample positioning apparatus, all the problems relating to the conventional type of piezo-scanner can be eliminated, but there is provided only the apparatus with the coarse adjustment mechanism in the Z-axial direction and the fine adjustment mechanism in the Z-axial direction integrated thereinto, and no consideration is found on the necessity that the scanning mechanisms in the x-axial and y-axial directions should be integrated into those mechanisms. The sample positioning apparatus based on the conventional technology has been used only, and no consideration has been made on the possibility of using it in scanning with a probe.

Then, the owner of the present invention developed the probe scanning apparatus as shown in FIG. 9, for which a patent application was filed in Japan under Japanese Patent Application No. HEI 8-118015 and in the United States under Ser. No. 08/855,543. This probe scanning apparatus has, as clearly understood from the figure, a first poise coil motor comprising a magnet 2 having a shaft section 3, a movable element 4 with a coil 6 wound therearound, and a membrane 5, each mounted in the upper section inside a frame 1. Fixed to the movable part 4 is a spindle 8 extending in the z-axial direction. Placed at the lower edge section of this spindle 8 is a displacement detector 9, and further a cantilever and a probe (chip) 10 are attached to the displacement detector 9.

On the other hand, the frame 1 has a slender pipe section 14 projecting to a sample chamber and a thick pipe section 15 communicated to the section, and an internal tube 13 is supported by a viscous body 17 inside the thick pipe section 15. Also the spindle 8 is elastically supported by first and second springs 11, 12 held by the internal tube. A heating coil 16 is energized to soften the viscosity body 17 at the time of coarse adjustment in z-axial direction of the probe 10.

Attached to an inside section in the side of the frame 1 is a second poise coil motor comprising a magnet 21 having a shaft section 22, a movable element 23 with a coil 25 wound therearound, and a membrane 24. Fixed to the movable element 23 is a spindle 27 extending in the x-axial direction, and a free edge of the spindle 27 is fixed to a portion 15a of the thick pipe section 15 through a fine line 26. Also a third poise coil motor is attached, although it is not shown in the figure, to an inside section in the side of the frame 1 in a different direction by 90° from the second poise coil motor, and the movable element of third poise coil motor and the thick pipe section 15 are connected to each other through a fine line and a spindle neither of which are also not shown in the figure. Then, by driving the second and third poise coil motors, scanning in the x-axial and y-axial directions is executed by the probe 10.

Provided in a position opposite to the probe 10 is a sample base 31 and a sample 32 to be tested is placed thereon. The sample base 31 is placed on a stage 33 for coarse adjustment in x-, y-, z-axial directions.

By the way, in the probe scanning apparatus having the configuration as described above, it is impossible to make higher a resonance frequency f0 of the fine adjustment mechanism in the z-axial direction comprising the first poise coil motor, spindle 8, displacement detector 9, and the probe 10. It is generally known that, in a probe scanning apparatus for a probe microscope, a scanning frequency in the Z-axial direction can be used for observation of a sample only at a range of $\frac{1}{5}$ or $\frac{1}{10}$ or less of the resonance frequency f0 of the fine adjustment mechanism in the z-axial direction. Accordingly, in the probe scanning apparatus shown in FIG. 9, it is impossible to observe a sample by means of fast scan with the probe because a resonance frequency f0 of the fine adjustment mechanism in the z-axial direction cannot be made higher.

An object of the present invention is to provide a probe scanning apparatus for a probe microscope which can resolve the problems in the conventional technology described above and also make higher a resonance frequency f0 of the probe scanning apparatus. Another object of the present invention is to provide a probe scanning apparatus for a probe microscope in which fast scanning with a probe can be executed at a high speed.

SUMMARY OF THE INVENTION

To achieve the above-described objects, a probe scanning apparatus for a probe microscope according to the present invention, used for measuring a form or physical properties of a surface of a sample by approaching or contacting the surface thereof, comprises a spindle supported by an elastic member and driven at least in the z-axial direction which is a vertical direction to the surface of the sample, and a probe member supported at an edge section in the side of the sample surface of the spindle through a displacement enlarging member for enlarging displacement according to movement of the spindle.

With the present invention, the probe member is supported through the displacement enlarging member, so that a resonance frequency for the probe scanning apparatus can be made higher.

DETAILED DESCRIPTION OF THE INVENTION

Detailed description is made hereinafter for the present invention with reference to the related drawings. At first, description is made for a resonance frequency f0 when the probe 10 is driven in the z-axial direction which is a vertical direction to the surface of a sample in the probe scanning apparatus shown in FIG. 9 with reference to FIG. 4 and FIGS. 5A–5C.

Figure 4:
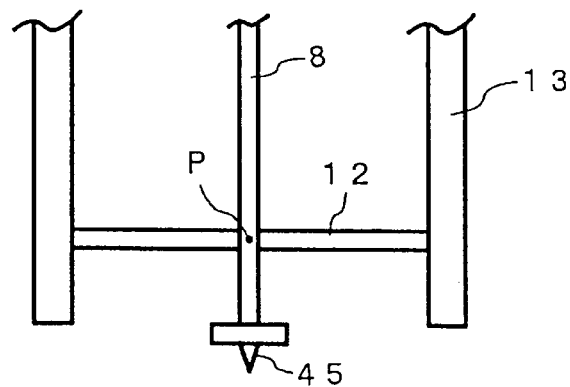
FIG. 4 is a view showing configuration as one example of the probe scanning apparatus.
Figure 9:
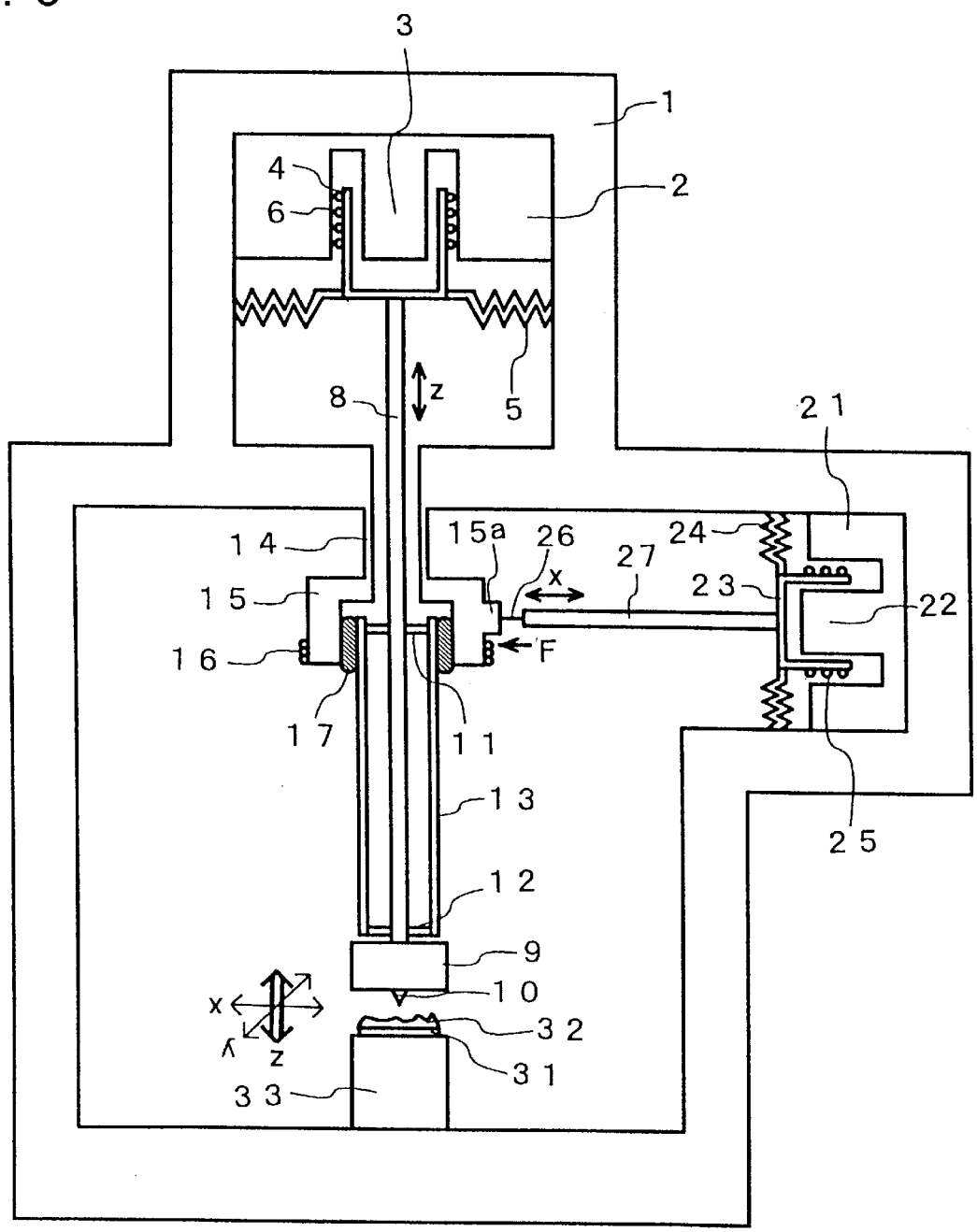
FIG. 9 is a view showing configuration of the probe scanning apparatus for a probe microscope developed by the applicant of the present invention.

FIG. 4 is a view showing one example of an attachment structure of the probe 45 provided in the lower edge section of the spindle 8 in the probe scanning apparatus shown in FIG. 9. In this example, as shown in the figure, the probe 45 is attached directly to the lower edge section of the spindle 8. It should be noted that the probe is attached to a cantilever in a case where the probe microscope is an inter-atomic force microscope although it is not shown in the figure.

Figures 5A, 5B, 5C:
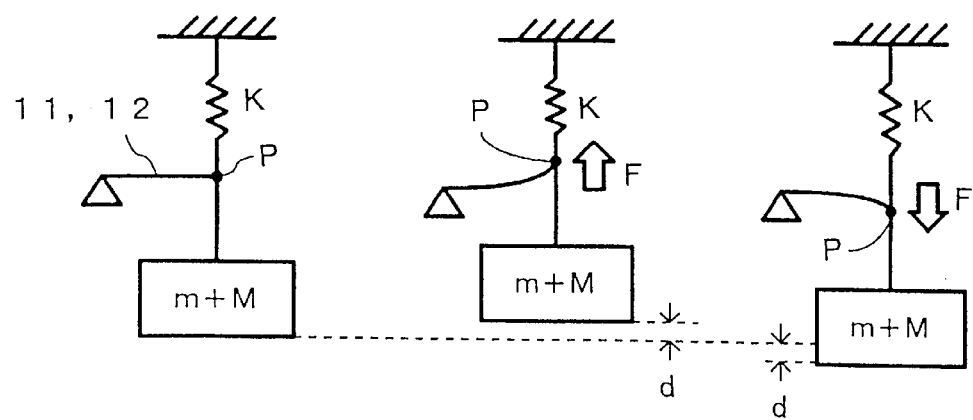
FIGS. 5A–5C are views each showing the equivalent to the system in FIG. 4.

FIGS. 5A–5B are views showing the equivalent to the system shown in FIG. 4. A spring constant K is specified so that a total spring constant K of the first and second springs 11, 12 is displaced by a specified length d at a maximum thrust F* of the first poise coil motor. Assuming that m indicates a total mass of a mass of the movable section of the first poise coil motor and a mass of the spindle 8 and also that M indicates a total of a mass of the probe 45 and an equivalent mass of the springs 11, 12, the expression of motion in the system is as follows.

$$F = (m+M)d^2z/dt^2 + Kz$$

Accordingly, the resonance frequency f01 of the system is obtained as follows.

[Expression 1]

$$f01 = \frac{1}{2\pi}\sqrt{\frac{K}{m+M}}$$

Wherein K is equal to F*/d (K=F*/d), so that the above expression is changed as follows.

[Expression 2]

$$f01 = \frac{1}{2\pi}\sqrt{\frac{F^*/d}{m+M}} \quad (1)$$

Figure 1:
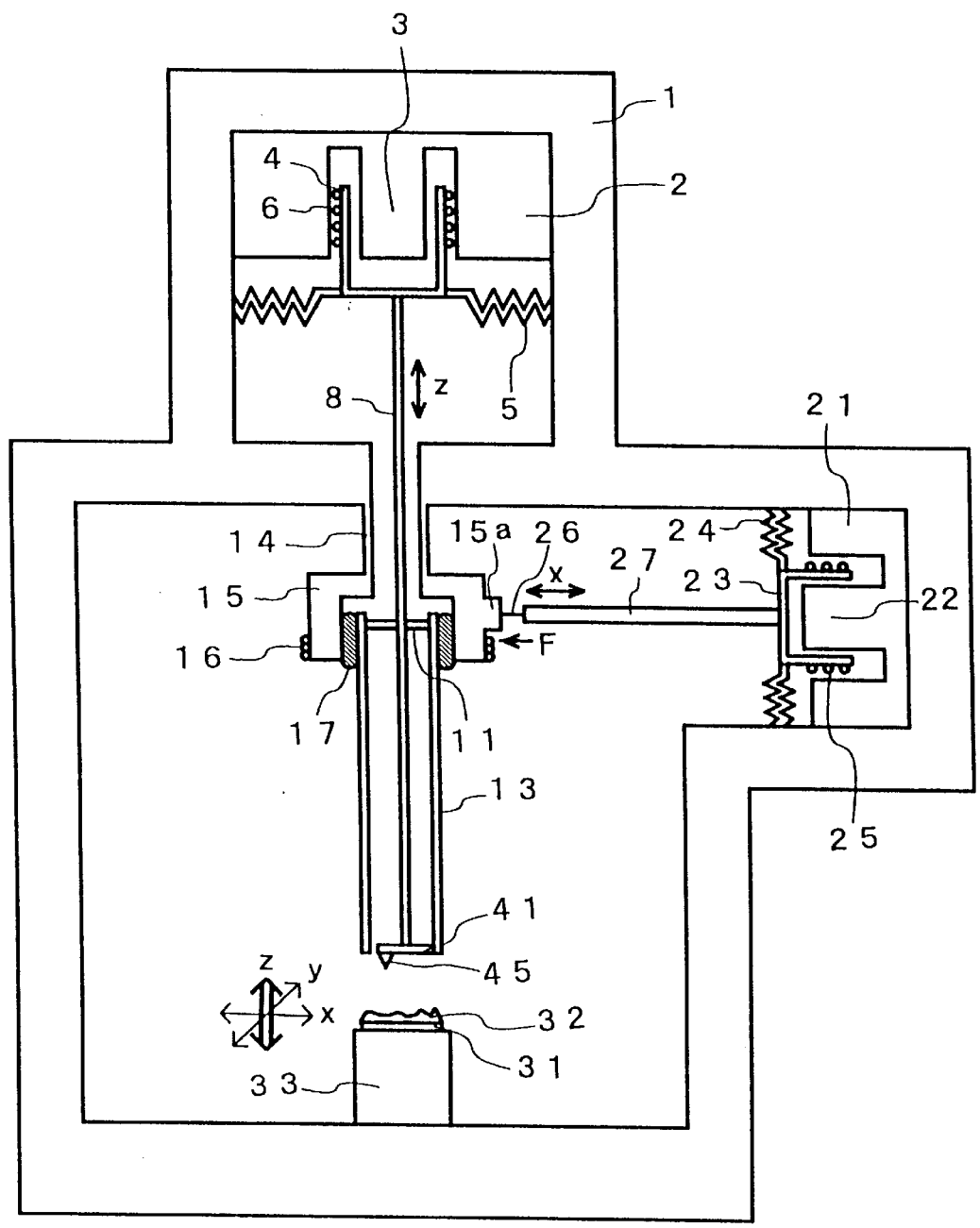
FIG. 1 is a view showing configuration according to the first embodiment of the present invention.

Next description is made for a first embodiment of the present invention with reference to FIG. 1. FIG. 1 is a view showing configuration according to the first embodiment of the present invention. In the figure, the reference numeral 41 indicates a cantilever type of spring, the reference numeral 45 indicates a probe, and other reference numerals indicate the sections corresponding to those in FIG. 8 or the equivalent sections thereto. The probe 45 is sometimes attached to a cantilever, but that case is not shown in the figure.

Figure 2:
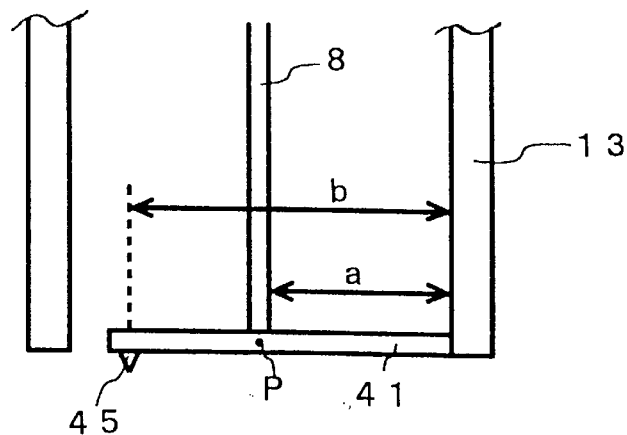
FIG. 2 is an enlarged view of the key section of FIG. 1.

FIG. 2 is an enlarged view of a key section in this embodiment, and the same reference numerals in the figure indicate the sections corresponding to those in FIG. 1. Assuming that P indicates a point of connecting the spindle 8 to the spring 41 and s indicates an enlargement ratio according to the cantilever type of spring 41, as shown in the figure, the expression: s=b/a is obtained. Namely, the probe 45 moves in the z-axial direction by s times as much as the displacement for which the point P moves in the z-axial direction. Herein, b indicates a length of the spring 41 and a constant.

Next, consideration is given to a resonance frequency f02 of the fine adjustment mechanism in the z-axial direction of the probe scanning apparatus according to the embodiment.

In the embodiment, when a force F by the first poise coil motor is applied to the point P, the probe 45 is displaced by a portion in the +z-axial direction or in the −z-axial direction depending on the direction of the force F. Accordingly, when the spring constant $K_0$ (torque/angle of units) is specified so that the probe 45 is displaced only by a specified length d at the maximum thrust F* of the first poise coil motor, the spring 41 vibrates by d/b radian, then the next expression is obtained.

$$a \times F^* = K_0 \times d/b$$

Accordingly, the spring constant $K_0$ of the spring 41 is obtained as follows.

$$K_0 = abF^*/d \quad (2)$$

And the expression of motion is obtained as follows.

$$aF = (I + a^2 m)d^2\theta/dt^2 + K_0\theta \quad (3)$$

Wherein I indicates the moment of inertia of the spring 41 which is a value including a probe and an mechanism for attaching the probe thereto, θ indicates an angle of run out of the spring 41, and m indicates a total mass of the movable sections 4, 6 of the poise coil motor and the spindle 8. A resonance frequency f02 of the system shown in FIG. 2 is obtained through the expression described below through the expression (3).

[Expression 3]

$$f02 = \frac{1}{2\pi}\sqrt{\frac{K_o}{I + a^2 m}} \quad (4)$$

$$= \frac{1}{2\pi}\sqrt{\frac{F^*/d}{I/ab + m \cdot a/b}}$$

-continued $$= \frac{1}{2\pi}\sqrt{\frac{F^*/d}{s \cdot I/b^2 + m \cdot 1/s}}$$

From this expression, assuming that the same poise coil motor is used and the same mass m as well as moment of inertia I are used, it is understood that the value f02 becomes a maximum value f02* which is expressed as follows when s is $\{m/(I/b^2)\}^{1/2}$.
[Expression 4]

$$f02^* = \frac{1}{2\pi}\sqrt{\frac{F^*/d}{2\sqrt{m \cdot I/b^2}}}$$

Herein, assuming that the expression: $M'=(I/b)^2$ is substituted into the above expression, the following expression is obtained.
[Expression 5]

$$f02^* = \frac{1}{2\pi}\sqrt{\frac{F^*/d}{2\sqrt{m \cdot M'}}} \quad (5)$$

As M' is equivalent to or smaller than M in the expression (1) and m is generally much larger as compared to M' and M, f02* becomes larger than f01 in the expression (1).

It is practically possible to make m around 5 g and M' around 50 mg, so that, assuming that the values are specified as follows: m=5 g, M'=M=50 mg, a value of $(m/M')^{1/2}$ is 10. As it is possible to make s equal to 10 in production, assuming that s is set to 10, a resonance frequency f02 of the system shown in FIG. 2 is obtained as follows through the expression (4).
[Expression 6]

$$f02 = \frac{1}{2\pi}\sqrt{\frac{F^*/d}{5/10 + 10 \times 0.05}} = \frac{1}{2\pi}\sqrt{\frac{F^*}{d}}$$

The value obtained through this expression is the same as that of f02* obtained through the expression (5) in which the values are set as follows: m=5 g and M'=50 mg. As a comparison, by computing a resonance frequency of the system in FIG. 4 through the expression (1), the following expression is obtained. As the system in FIG. 4 is different in configuration therefrom, the values of m and M therein are different, strictly speaking, from the values m and M in the system in FIG. 2 respectively, but it can be said with safety that the values are practically almost the same. Accordingly, the resonance frequency f01 in the system in FIG. 4 is obtained as follows through the expression (1).
[Expression 7]

$$f01 = \frac{1}{2\pi}\sqrt{\frac{F^*/d}{5.05}}$$

Accordingly, the following expression is obtained: f02/f01=$(5.05)^{1/2}$, from which it is understood that the resonance frequency f02 is around 2.2 times higher as compared to the resonance frequency f01. As described above, with configuration making use of the enlarged action of a lever, a resonance frequency in the system obtaining the same displacement d can be made higher even the same poise coil motor is used.

Figure 3:
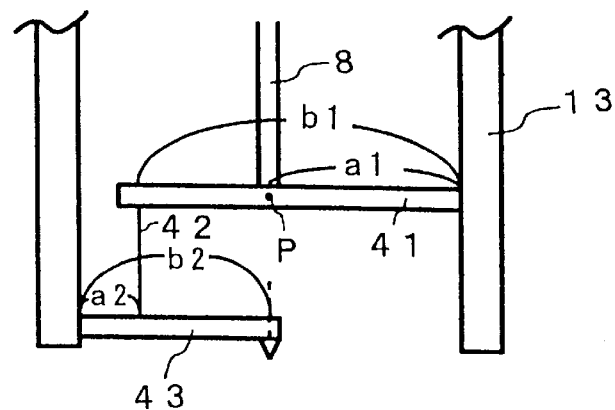
FIG. 3 is a view showing the equivalent of the system of the probe scanning apparatus according to the first embodiment.

Next description is made for a second embodiment of the present invention with reference to FIG. 3. Assuming that, as shown in figure, P indicates a point for connecting the spindle 8 to the first spring 41 and s1 indicates an enlargement ratio according to the cantilever type of first spring 41, the expression: s1=b1/a1 is obtained. Namely, the fine line 42 moves in the z-axial direction by s1 times as much as the displacement for which the point P moves in the z-axial direction. Similarly, assuming that s2 indicates an enlargement ratio according to the cantilever type of second spring 43, the expression: s2=b2/a2 is obtained. Namely, the probe moves in the Z-axial direction by s2 times more as compared to the displacement for which the fine line 42 moves in the Z-axial direction. The total enlargement ratio s at this time is as follows: s=s1×s2. When the position of the fine line 42 is changed, namely by making the length a2 shorter (longer) by a length of b1 made to be longer (shorter), an enlargement ratio s can appropriately be specified. With the configuration as described above, an enlargement ratio s can be specified from a wide range with comparatively compact configuration as compared to the embodiment shown in FIG. 2. In addition, the spindle 8, probe 45, and internal tube 13 can concentrically be constructed. In the embodiment, it is conceivable, assuming that a1 and b2 each described above are constants, that a value obtained by adding b1 to a2 is constant.

Next description is made to a resonance frequency f03 of the fine adjustment mechanism in the z-axial direction of the probe scanning apparatus according to the embodiment. In the embodiment, when a force F by the first poise coil motor is applied to the point P, the probe 45 is displaced by a portion in the +z-axial direction or in the −z-axial direction depending on the direction of the force F. Accordingly, when a spring constant K1 (torque/angle of units) of the spring 41 and a spring constant K2 (torque/angle of units) of the spring 43 are specified so that the probe 45 is displaced only by a specified length d at the maximum thrust F* of the first poise coil motor, the spring 41 vibrates by d/b1 radian, then the expression therefor is as follows.
[Expression 8]

$$a_1 F^* = K_2 \cdot \frac{d}{b_2} \cdot \frac{b_1}{a_2} + K_1 \frac{d}{b_1} \cdot \frac{a_2}{b_2}$$

By modifying this expression, the expression is obtained as follows.
[Expression 9]

$$K_2 + K_1 \left(\frac{a_2}{b_1}\right)^2 = \frac{a_2 \cdot b \cdot a_1}{b_1} \cdot \frac{F^*}{d} \quad (6)$$

Also, the expression of motion is obtained as follows. ti a1F=$(I1+aI^2m)d^2\theta1/dt^2+K1\theta1+(I2 \times d^2\theta2/dt^2+K2\theta2)b1/a2$.
wherein I1 indicates the moment of inertia of the spring 41 which is a value including the fine line 42, I2 indicates the moment of inertia which is a value including a probe and an mechanism for attaching the probe thereto, θ 1 indicates an angle of run out of the spring 41, θ 2 indicates an angle of run out of the spring 43, and m indicates a total mass of the movable sections 4, 6 of the poise coil motor and the spindle 8. The angles θ 1 and θ 2 are in the relation as follows: b1×θ1=a2×θ2, whereby the expression of motion is as follows.

[Expression 10]

$$a_1 F = \left\{(I_1 + a_1^2 m)\frac{a_2}{b_1} + I_2 \frac{b_1}{a_2}\right\}\frac{d^2 \theta_2}{dt^2} + \frac{b_1}{a_2}\left\{K_2 + K_1\left(\frac{a_2}{b_1}\right)^2\right\}\theta_2$$

By substituting the expression (6) into the above expression, the following expression is obtained.
[Expression 11]

$$a_1 F = \left\{(I_1 + a_1^2 m)\frac{a_2}{b_1} + I_2 \frac{b_1}{a_2}\right\}\frac{d^2 \theta_2}{dt^2} + a_1 b_1 \frac{F^*}{d}\theta_2 \quad (7)$$

Accordingly, a resonance frequency f03 of the system is obtained as follows.
[Expression 12]

$$f03 = \frac{1}{2\pi}\sqrt{\frac{a_1 b_2 F^*/d}{(I_1 + a_1^2 m)\frac{a_1}{b_1} + I_2 \frac{b_1}{a_2}}} \quad (8)$$

$$= \frac{1}{2\pi}\sqrt{\frac{F^*/d}{\frac{1}{s}\left(\frac{I_1}{a_1} + m\right) + s\frac{I_2}{b_2}}}$$

From this expression, assuming that the same poise coil motor is used and the same mass m as well as moment of inertia I1, I2 are used, it is understood that the resonance frequency f03 of the system becomes a maximum value f03* which is expressed as follows when s is the following expression.
[Expression 13]

$$s = \sqrt{\left(\frac{I_1}{a_a^2} + m\right)\bigg/\left(\frac{I_2}{b_2^2}\right)}$$

$$f03^* = \frac{1}{2\pi}\sqrt{\frac{F^*/d}{2\sqrt{\left(\frac{I_1}{a_1^2} + m\right) \cdot \frac{I_2}{b_2^2}}}}$$

Herein, assuming that values are set as follows: M1'=I1/a1² and M2'=I2/b2², the above expression is changed as follows.
[Expression 14]

$$f03^* = \frac{1}{2\pi}\sqrt{\frac{F^*/d}{2\sqrt{(M_1' + m)M_2'}}} \quad (9)$$

As M1' and M2' are equivalent to or smaller than M in the expression (1) and m is generally much larger as compared to M1', M2' and M, f03 becomes larger than f01 in the expression (1), which is the same as that in the first embodiment. As described above, with configuration making use of the enlarged action of a lever, a resonance frequency in the system obtaining the same displacement d can be made higher even if the same poise coil motor is used.

Figure 6:
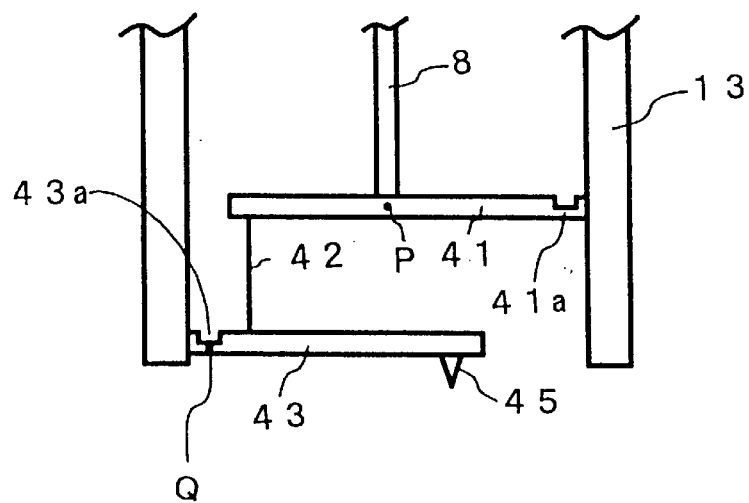
FIG. 6 is a view showing configuration of the key section thereof according to the second embodiment of the present invention.

Next description is made for a third embodiment of the present invention with reference to FIG. 6. In this embodiment, concave sections 41a, 43a are provided in places adjacent to the sections connecting the first and second springs 41, 43 to the internal tube 13 respectively, so that the enlarged action of a lever can more effectively be made use of. It should be noted that the same reference numerals in the figure are assigned to the section equivalent to or corresponding to those in FIG. 2. With this embodiment, a resonance frequency f03 of the system can also be made larger like in each of the embodiments.

Figure 7:
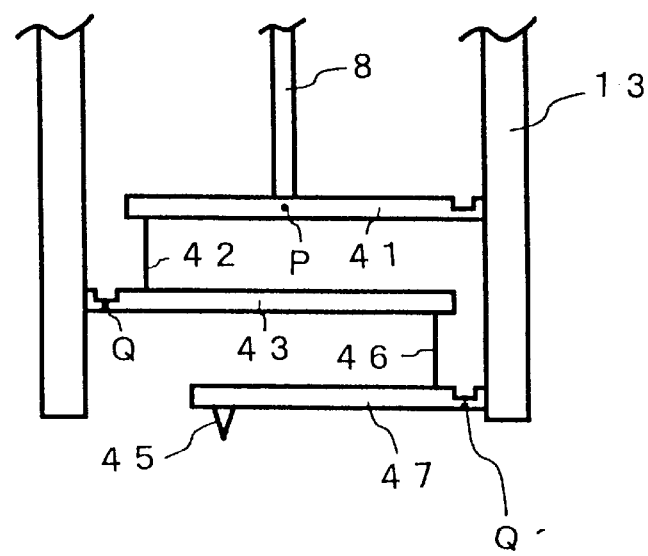
FIG. 7 is a view showing configuration of the key section thereof according to the second embodiment of the present invention.

Next description is made for a fourth embodiment of the present invention with reference to FIG. 7. In this embodiment, configuration making use of the enlarged action of levers in three stages is employed. In the figure, designated at the reference numeral 46 is a fine line, at 47 a third spring, and the other reference numerals indicate the same or the equivalent to the sections in FIG. 6. It should be noted that the present invention is not limited to levers with two stages or that with three stages.

Figure 8:
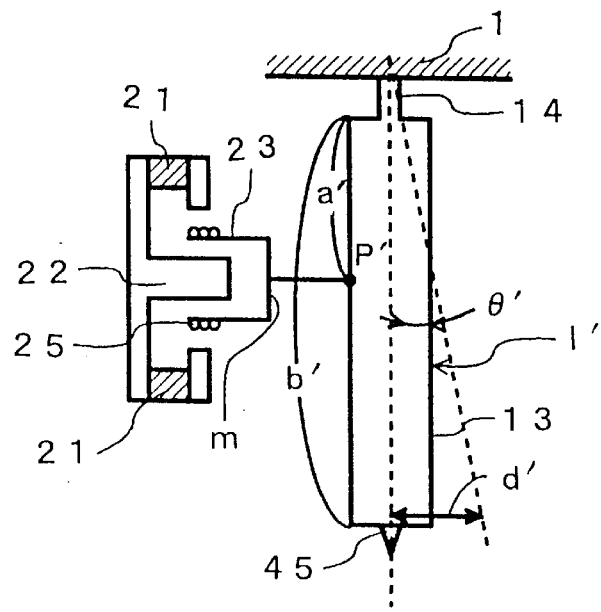
FIG. 8 is a view showing the equivalent to the system of the probe scanning apparatus driven in the x- and y-axial directions.

The description was made above for the case when the spindle 8 of the probe scanning apparatus moves in the Z-axial direction, but a resonance frequency of the system can be made higher also when the probe scanning apparatus is moved in the x- or y-axial direction for scanning. The scanning systems in the x- and y-axial directions have the same or equivalent configuration respectively, so that description is made only for the scanning system in the x-axial direction as a representative example with reference to FIG. 1 and FIG. 8. Herein, FIG. 8 is a view showing the equivalent to the key section of the view shown in FIG. 1, and the same reference numerals are assigned to the members corresponding to those in FIG. 1.

The scanning system in the x-axial direction comprises a second poise coil motor comprising a magnet 21 having a shaft section 22, a movable element 23 with a coil 25 wound therearound, and a membrane 24; a spindle 27; and a fine line 26. When the second poise coil motor is actuated, a force F from the movable element 23 is applied to a portion 15a of the thick pipe section 15 through the spindle 27 as well as the fine line 26. When the force is applied thereto, the system comprising the thick pipe section 15, internal tube 13, first spring 41, and probe 45 is oscillated with around a point as a supporting point connecting the slender pipe section 14 through which the frame 1 and the thick pipe section 15 are connected to each other to the frame 1, and as a result, the probe 45 is displaced by a portion in the +x-axial direction or −x-axial direction according to the direction of the force F. Accordingly, when a spring constant K' (torque/angle of units) is specified so that the probe 45 is displaced only by a specified length d' at the maximum thrust F* of the second poise coil motor, the spring 14 vibrates by d'/b' radian, so that a value of the K' is obtained as follows through the expression: a'×F*=K'×d'/b'.

$$K'=a'b'F^*/d' \quad (10)$$

Also, the expression of motion is obtained as follows.
[Expression 15]

$$a'F = (I' + a'^2 m')\frac{d^2 \theta'}{dt^2} + +K'\theta' \quad (11)$$

wherein I' indicates the moment of inertia occurring when the tubular oscillating body comprising the thick pipe section 15, viscosity body 17, internal tube 17, first and second springs 41, 43, and probe 45 is oscillated, θ' indicates an angle of run out of the tubular oscillating body, and m' indicates a total mass of the movable section 23 of the poise coil motor and arms 26, 27. A resonance frequency f of the system shown in FIG. 8 is obtained by the expression described below through the expression (11).

[Expression 16]

$$f' = \frac{1}{2\pi}\sqrt{\frac{K'}{I' + a'^2 m'}} = \frac{1}{2\pi}\sqrt{\frac{F^*/d}{\frac{I'}{a'b'} + \frac{a'}{b'}m'}} \quad (12)$$

$$= \frac{1}{2\pi}\sqrt{\frac{F^*/d'}{s'\frac{I'}{b'^2} + \frac{1}{s'}m'}}$$

Herein, the expression: s'=b'/a' is obtained. It is understood that the expressions (10), (11), (12) have entirely the same forms as those of the expressions (2), (3), (4). Namely, the embodiment can be handled in the same manner as that of the first embodiment when the probe is driven in the z-axial direction which is a vertical direction to the surface of the sample. Accordingly, in the case of this expression, s' may be set as follows to make f' be maximum.

s'=m'×a'$^2$

Namely, the expression may be set as follows.

I'=m'×a'$^2$

Practically, m' is around 5 g, and when b' is around 50 mm, I' can be made around 3000 to 4000 (g·mm$^2$), and for this reason, a maximum resonance frequency can be obtained by setting a' substantially to 25 mm.

As clearly understood from the above description, with the present invention, a resonance frequency of a probe scanning apparatus for a probe microscope can be made extremely higher as compared to that of an apparatus based on the conventional technology. For this reason, a driving frequency for a probe scanning apparatus at the time of observation of a sample can largely be increased, whereby fast scan can resultantly be established.

What is claimed is:

1. A probe scanning apparatus for a probe microscope used for measuring a form or physical properties of a surface of a sample by approaching or contacting the surface thereof; said apparatus comprising:
    a spindle supported by an elastic member and driven at least in the z-axial direction which is a vertical direction to said surface of the sample; and
    a probe member supported at an edge section in the side of said sample surface of said spindle through a displacement enlarging member for enlarging displacement according to movement of said spindle; wherein a resonance frequency of said probe scanning apparatus is enlarged.

2. A probe scanning apparatus for a probe microscope according to claim 1; wherein said spindle is driven in the x-axial and y-axial directions through a tubular oscillating body driven by an elastic member moving forward or backward in the x-axial and y-axial directions within a plane vertical to said spindle.

3. A probe scanning apparatus for a probe microscope according to claim 2; wherein, assuming that a' indicates a length from a fixed edge of said tubular oscillating body to a point P' receiving a force from said elastic member, and b' (a constant) indicates a length from said fixed edge thereof to a position attaching thereto said probe member at a free edge thereof, a value through b'/a' is set to a value decided by the expression described below or a value adjacent to the value;

$$b'/a' = \{m'/(I'/b'^2)\}^{1/2}$$

wherein m' indicates a total mass of a mass of an elastic member moving forward or backward in the x-axial and y-axial directions and a mass of a force conveying member for conveying a force generated by said elastic member to said tubular oscillating body, and I' indicates the moment of inertia of said tubular oscillating body.

4. A probe scanning apparatus for a probe microscope according to claim 2; wherein the elastic member supporting the spindle comprises a movable section of a poise coil motor, the elastic member for driving the tubular oscillating body comprises a cantilever-type elastic member, and a value b/a of the cantilever-type elastic member satisfies the expression;

$$b/a = \{m/(I/b^2)\}^{1/2}$$

where a represents a length from a fixed edge of the cantilever-type elastic member to a point of the cantilever-type elastic member which receives a force from the spindle, b represents a length from the fixed edge of the cantilever-type elastic member to free edge thereof, m represents the combined mass of the movable section of the poise coil motor and the spindle, and I represents the moment of inertia of the cantilever-type elastic member and the probe member; and wherein a value b'/a' of the tubular oscillating body satisfies the expression;

$$b'/a' = \{m'/(I'/b'^2)\}^{1/2}$$

where a' represents a length from a fixed edge of the tubular oscillating body to a point of the tubular oscillating body which receives a force from the cantilever-type elastic member, b' represents a length from the fixed edge of the tubular oscillating body to a free edge thereof, m' represents the combined mass of the cantilever-type elastic member and a force conveying member for conveying a force generated by the cantilever-type elastic member to the tubular oscillating body, and I represents the moment of inertia of the tubular oscillating body.

5. A probe scanning apparatus for a probe microscope according to claim 1; wherein said elastic member supporting or driving said spindle is a movable section of a poise coil motor and said displacement enlarging member comprises a cantilever type of elastic member.

6. A probe scanning apparatus for a probe microscope according to claim 5; wherein, assuming that a indicates a length from a fixed edge of said cantilever type of elastic member to a point P receiving a force from said spindle, and b (a constant) indicates a length from said fixed edge to a position attaching thereto said probe member at a free edge thereof, a value of b/a is set to a value decided by the expression described below or a value adjacent to the value;

$$b/a = \{m/(I/b^2)\}^{1/2}$$

wherein m indicates a total mass of a mass of the movable section of said poise coil motor and a mass of said spindle, and I indicates the moment of inertia of said elastic member as well as of said probe.

7. A probe scanning apparatus for a probe microscope according to claim 1; wherein said elastic member supporting or driving said spindle is a movable section of a poise coil motor and said displacement enlarging member comprises a plurality of cantilever type of elastic members in a plurality of stages connected to each other so that a quantity of displacement in the last stage is enlarged.

8. A probe scanning apparatus for a probe microscope according to claim 7; wherein said displacement enlarging member has an edge of the cantilever type of elastic member connected to a point adjacent to the fixed edge of the elastic member in the next stage with a firm and thin line.

9. A probe scanning apparatus for a probe microscope according to claim 8; wherein, assuming that a1 (a constant) indicates a length from a fixed edge of the elastic member in the first stage to a point P receiving a force from said spindle; b1 indicates a length from said fixed edge to said fine line; a2 indicates a length from a fixed edge of the elastic member in the second stage to said fine line; and b2 (a constant) indicates a length from said fixed edge to a position attaching thereto said probe member at a free edge thereof, a value of b1/a1×b2/a2 (=s) is set to a value decided by the expression described below or a value adjacent to the value;

$$s=\{(I1/a1^2+m)/(I2/b2^2)\}^{1/2}$$

wherein m indicates a total mass of a mass of the movable section of said poise coil motor and a mass of said spindle, I1 indicates the moment of inertia of said elastic member in the first stage as well as of said fine line, and I2 indicates the moment of inertia of said elastic member in the second stage as well as of said probe.

* * * * *